UNITED STATES PATENT OFFICE.

LUDWIG HEINRICH REUTER, OF TOMPKINSVILLE, NEW YORK.

COMPOSITION FOR DISINFECTING AND OTHER PURPOSES.

1,027,000.   Specification of Letters Patent.   Patented May 21, 1912.

No Drawing.   Application filed August 13, 1906.   Serial No. 330,440.

*To all whom it may concern:*

Be it known that I, LUDWIG H. REUTER, a citizen of the United States, residing at Tompkinsville, in the county of Richmond, borough of Richmond, city of Greater New York, and State of New York, have invented a new and useful Composition for Disinfecting and other Purposes, of which the following is a specification.

My invention relates to a composition for disinfecting and other purposes in the form of a solution having valuable properties, useful in the arts and for agricultural and hygienic purposes, and obtainable by combining formaldehyde with alkali borate or rosin or preferably both, and it includes what I regard as a new chemical compound formed and contained in such compositions which appears to be a condensation product of formaldehyde with abietic acid, the anhydrid of the latter being the principle constituent of the commercial rosin.

The composition which is the subject of my invention differs from all other products of that kind in so far as it does not contain any carbonate or caustic alkali, such as is contained, for instance, in the article creolin; and no carbonate nor caustic alkali is used in its manufacture. Furthermore, my composition does not contain any free acid such as, for instance, formic acid which is found invariably in the commercial formaldehyde solution of the market; the free formic acid contained in the formaldehyde used in my preparation having been eliminated by means of the alkali borate, which even if present in excess does not—like caustic alkalis—produce any oxidizing effect on formaldehyde and does not, like ammonia, combine with formaldehyde and produce basic bodies of undesirable properties.

It is well known that rosin, being impure anhydrid of abietic acid, is insoluble in water; it is equally known also that rosin dissolves in concentrated caustic alkalis and yields a strongly caustic and alkaline rosin soap being contained up to 40% in the so-called creolin of the market. I find by experiment that rosin is practically insoluble also in water containing more or less formaldehyde gas.

Now I have discovered that formaldehyde solution if properly combined with rosin and alkali borate yields a perfectly clear solution, which can be mixed with water in all proportions without separation of the rosin and without crystallization of the excess of alkali borate used. I will therefore describe a practicable way of carrying out this process for producing the above mentioned chemical compound and composition. For instance, 250 lbs. of an alkali borate, as borax, 50 lbs. of rosin and about 125 gallons of water are boiled together or heated in an autoclave under pressure, and a clear liquid is obtained, which if allowed to cool down to ordinary temperature ($+15°$ to $+25°$ C.) will separate not only the rosin but also the excess of alkali borate; of the 250 lbs. of alkali borate, of which one part is soluble only in twenty parts of water of 15° C., 50 lbs. will remain in solution, while 200 lbs. will separate in crystal form; at the same time also the rosin will be separated.

To the above mentioned solution comprising about 250 lbs. of alkali borate, about 50 lbs. of rosin and about 125 gallons of water,—while still warm—a 40 per cent. formaldehyde solution of the market is added in small quantities at a time, while stirring. The liquid becomes cloudy at first but by and by it becomes perfectly clear after about 500 lbs. of the formaldehyde solution have been added; a perfectly stable liquid is obtainable, for instance, if to the warm solution of 250 lbs. of alkali borate and 50 lbs. of rosin in 125 gallons of water, about 1300 lbs. of the 40% formaldehyde solution are added. The same result is obtained by heating 250 lbs. of alkili borate, 50 lbs. of rosin and 235 gallons of water and passing into the solution 520 lbs. of formaldehyde gas; or by heating 250 lbs. of alkali borate, 50 lbs. of rosin, 225 gallons of water and that quantity of trioxymethylene or paraformaldehyde, which is proportionate to 520 lbs. of formaldehyde—under pressure in an autoclace to a temperature of about 150° C. When ordinary commercial trioxymethylene or paraformaldehyde are used it is necessary to ascertain how much formaldehyde gas a weight quantity, say 5 grams, will yield by heating with 100 cc. of water in a pressure flask, as both articles are by-products in the formaldehyde manufacture and are never uniform.

Though not containing carbonate of alkali or ammonia or caustic alkali, which is known to oxidize formaldehyde into formic acid and which will always develop injurious, caustic or irritating effects, my new preparation has that weakly alkaline reaction, which is due to the presence of the absolutely harmless alkali borate. The alkali borate, serves as a two fold permanent protection for the formaldehyde, first, it neutralizes completely the free formic acid, and, secondly, it has the tendency to protect the formaldehyde from becoming polymerized and converted into paraformaldehyde, which is practically worthless as insecticide, antiseptic and disinfectant or for waterproofing purposes in the textile and paper industry, or as an addition to waterproof paints; for instance, to cold water paints containing casein.

As stated above the liquid composed as described can be mixed in all proportions with water above zero centigrade without separation of the rosin, but when macerated with warm water is split up into formaldehyde and abietic acid. I have found that the liquid, if cooled down below zero does not separate any alkali borate, though containing it in the proportion of one part to ten parts of the liquid, while 1:20 is known to be the solubility limit at $+15°$ C. But while no alkali borate crystallizes from the liquid I have found that at zero a semi-liquid, brownish yellow, transparent mass settles to the bottom, which I consider as being a condensation product of abietic acid with formaldehyde. If the ice cold liquid standing above that mass is removed and water of $+15°$ C. added, the mass is converted immediately into a flocculent whitish substance which, though being insoluble in water, redissolves in the liquid from which it has been removed which contains an excess of borax and formaldehyde.

I do not wish to limit myself to above mentioned proportions; viz: to a preparation containing 250 lbs. of alkali borate, 50 lbs. of rosin, 125 gallons of water and 1300 lbs. of the 40% formaldehyde solution, as various combinations will yield products, desirable and suitable for special purposes, which fall within the scope of my invention. It may be desirable, for instance, to use a large quantity of rosin, say, instead of one part of rosin for five parts of alkali borate, one part of rosin for 2–3 or 3.5 parts of alkali borate; also in this case clear liquids are obtained, but if these liquids are mixed with water, more or less opalescent or milky solution will be obtained containing part of the rosin-formaldehyde condensation product in finely suspended form. Such a liquid I found very useful as insecticide for spraying plants or shrubs, corn, cotton, etc., which are infested with insects of the most destructive character; the finely suspended rosin-formaldehyde condensation product—when used as spray sticks to the plant, etc., and prevents the rapid volatilization of the free formaldehyde. The effect is much more energetic and lasting than that obtainable with ordinary formaldehyde and in no instance was any injurious effect upon flower beds or cotton squares observed, while a good deal of damage resulted from the use of the acid formaldehyde of the market or from strongly alkaline creolin solution, etc. The insecticidal effect of the rosin-formaldehyde condensation product—not only upon plants, but also upon wool or sheep, upon cattle, dogs and horses was very remarkable and it was found also to be an ideal means for dressing wounds as an antiseptic and also for disinfecting purposes. Such a preparation containing more rosin is obtained by heating, for instance, 250 lbs. of alkali borate, 75–80 lbs. of rosin and 125 gallons of water and adding to the warm solution 1325–1330 lbs. of the 40% formaldehyde solution. The same results are obtained by heating 250 lbs. of alkali borate, 75–80 lbs. of rosin, 225 gallons of water and a quantity of trioxymethylene or paraformaldehyde proportionate to 520 lbs. of formaldehyde gas in an autoclave to a temperature of 150° C. or over. Also this preparation is perfectly clear when finished and it shows, like the first-mentioned preparation containing less rosin, a weakly alkaline reaction due to the alkali borate. Any alkali borate may also be used, as sodium, potassium, or lithium borate. In some cases also the addition of soap, alcohol or glycerin or of essential oils, like eucalyptus may be desired and I have found that such additions improve the efficiency of the preparation if used for special purposes. For instance a small percentage of soap or glycerin has been found to be of advantage when the liquid is used for spraying purposes by farmers, cotton-growers, etc., as soap and glycerin, like alkali borate, protects the formaldehyde from becoming polymerized and oxidized. Continuing my investigations on that subject, I have discovered that if to a liquid containing in 100 lbs. about 30 lbs. of soft (potash) soap or 30 lbs. of hard (soda) soap prepared from oils or fats containing principally glycerids of oleic or ricinoleic acid and the like and 20 lbs. of formaldehyde gas, about 10 lbs. of rosin are added and the mixture digested, while stirring at a temperature of $+40°$ to $+50°$ C., a clear liquid is obtained, which contains in addition to the soap and to an excess of formaldehyde a condensation product of rosin with formaldehyde. This new preparation keeps clear at ordinary temperature, say at $+15°$ to $+25°$ C., but on exposing it for some time to zero temperature part of the rosin-formaldehyde condensation product, separates, but redissolves as soon as the liquid has assumed again ordinary temperature. On mixing the new preparation with water some of the condensation product is precipitated in floccules and the solution consequently does not possess that uniform appearance, which is obtained when the preparation, free from soap, but containing alkali borate and fully described above, is dissolved in water.

Now I have discovered, that a combination of soap, rosin and formaldehyde, dissolving well in all proportions in water, is obtained, if an excess of alkali borate is added. This new preparation can be obtained as follows: About 30 lbs. of soft (potash) soap, or 30 lbs. of hard (soda) soap, prepared from oils or fats containing glycerids of oleic or ricinoleic acid—are dissolved in 50 pints of water and 20 pounds of formaldehyde gas passed into the soap solution at a temperature of about 40° C., while stirring. Then 10 pounds of rosin are added and the digestion of the mixture continued, until all the rosin is dissolved, then I add a mixture, which has been prepared by dissolving about 25 lbs. of alkali borate in a liquid comprising about 50 pints of water and about 20 pounds of formaldehyde gas. I continue to stir and to digest until the liquid presents a uniform mixture, which yields, when mixed with water a clear liquid, which becomes opalescent if standing for a couple of hours and milky white if standing for a couple of days, but without precipitating the condensation product in floccules. A liquid of this character and containing soap, free formaldehyde, alkali borate and the condensation product, I have found to be useful for agricultural and hygienic purposes, inasmuch as it does not contain any free caustic alkali, as it is contained in creolin or other similar coal tar products.

The superior efficiency of my preparation is due to a large extent to the condensation product, which covers the plants and is—thanks to a continuous development of small quantities of formaldehyde, disliked by all insects. Also as a general disinfectant and antiseptic I have found my new preparation superior to other formaldehyde preparations of the market, inasmuch as, when the 40 per cent. formaldehyde solution of the market has been used in its manufacture, the free formic acid, always contained therein, has been entirely neutralized by the alkali borate and my preparation does not develop consequently irritating effects, due to formic acid. At the same time the condensation product covers the wound and constantly developing small quantities of formaldehyde, its efficiency is not temporary but lasting.

The method of preparation as well as the proportions can be varied, within the scope of my claims. For instance instead of passing formaldehyde gas into the solutions a proportionate quantity of the 40 per cent. formaldehyde solution of the market can be used, also trioxymethylene and paraformaldehyde can be used in proportion, but in this case the materials have to be heated under pressure in an autoclave at a temperature of not below 150° C., to be sure, that the polymerized compounds are properly converted into formaldehyde gas and dissolved.

Instead of dissolving the rosin in the soap, it can be dissolved also in the alkali borate solution as described above, or in the formaldehyde solution. I wish to state also, that instead of commercial rosin, any substance which yields abietic acid, as for example purified or pure abietic acid may be used. Any alkali borate can be used, such as lithium, potassium, or sodium borate, but in practice the cheapest namely, sodium borate or borax is preferable.

Instead of using a composition comprising 30 lbs. of soap, 10 lbs. of rosin, 40 lbs. of formaldehyde gas, 25 lbs. of alkali borate and 110 pints of water, also more or less soap can be taken; if a liquid is desired yielding with water a mixture containing more of the condensation product in finely suspended form, then, instead of 10 lbs. of rosin more, for instance, 15 lbs. can be used. Another way of producing the preparation is the following. 330 lbs. of a liquid, obtained by digesting together about 30 lbs. of rosin, about 60 lbs. of formaldehyde gas, about 90 lbs. of soap and about 150 pints of water, is mixed with 450 lbs. of a liquid containing about 150 lbs. of alkali borate, 90 lbs. of soap, 60 lbs. of formaldehyde gas and 150 pints of water; the mixture is digested for 3-4 hours; also this liquid mixes with water in all proportions.

Having thus fully described my invention, what I claim and desire to secure by Letters-Patent is:—

1. A composition comprising a solution of formaldehyde, alkali borate, and a substance which at zero centigrade is a semi-liquid, brownish-yellow, transparent mass, which is insoluble in water but miscible therewith in all proportions above zero centigrade without separation of the ingredients, which is soluble in water containing borax and formaldehyde, and which when macerated with warm water is split up into formaldehyde and abietic acid.

2. A composition comprising a solution of formaldehyde, alkali borate, soap, and a substance which at zero centigrade is a semi-liquid, brownish-yellow, transparent mass which is insoluble in water but miscible therewith in all proportions above zero centigrade without separation of the ingredients, which is soluble in water containing borax and formaldehyde, and which when macerated with warm water is split up into formaldehyde and abietic acid.

3. A composition comprising a solution of formaldehyde, alkali borate, potash soap, and a substance which at zero centigrade is a semi-liquid, brownish-yellow, transparent mass which is insoluble in water but miscible therewith in all proportions above zero centigrade without separation of the ingredients, which is soluble in water containing borax and formaldehyde, and which when macerated with warm water is split up into formaldehyde and abietic acid.

4. A composition comprising a solution of formaldehyde, borax, and a substance formed from abietic acid and formaldehyde which at zero centigrade is a semi-liquid, brownish-yellow mass which is insoluble in water but miscible therewith in all proportions above zero centigrade without separation of the ingredients, which is soluble in water containing borax and formaldehyde, and which when macerated with warm water is split up into formaldehyde and abietic acid.

5. A composition comprising a solution of formaldehyde, borax, potash soap, and a substance formed from abietic acid and formaldehyde which at zero centigrade is a semi-liquid, brownish-yellow mass which is insoluble in water but miscible therewith in all proportions above zero centigrade without separation of the ingredients, which is soluble in water containing borax and formaldehyde, and which when macerated with warm water is split up into formaldehyde and abietic acid.

6. A composition comprising a solution of formaldehyde, borax, soap, and a substance formed from abietic acid and formaldehyde which at zero centigrade is a semi-liquid, brownish-yellow mass which is insoluble in water but miscible therewith in all proportions above zero centigrade without separation of the ingredients, which is soluble in water containing borax and formaldehyde, and which when macerated with warm water is split up into formaldehyde and abietic acid.

7. A process of making a composition for antiseptic and disinfecting purposes and the like, which comprises the treatment with formaldehyde, of a mixture of alkali borate and rosin substantially as described.

8. A process of making a composition for antiseptic and disinfecting purposes and the like, which comprises the treatment with formaldehyde of a solution of alkali borate, soap, and a substance yielding abietic acid substantially as described.

9. A process of making a composition for antiseptic and disinfecting purposes and the like, comprising the treatment with formaldehyde, of a solution of alkali borate, and a substance comprising abietic acid to produce a composition which at zero centigrade precipitates a semi-liquid brownish yellow mass, substantially as described.

10. A composition of matter comprising a solution of formaldehyde, alkali borate, soap, and a substance which at zero centigrade settles to the bottom of the solution as a semi-liquid brownish yellow mass, and which if the liquid above it be removed and water at about 15° centigrade be added is thereby converted into a flocculent whitish substance which is insoluble in water, but which redissolves in the liquid from which it has been removed and which when macerated with warm water yields formaldehyde and abietic acid.

11. A process of making a composition for antiseptic and disinfecting purposes and the like, which comprises a treatment with formaldehyde, of a solution of alkali borate, rosin and soap.

In testimony whereof I have hereunto set my hand, in the presence of two subscribing witnesses.

LUDWIG HEINRICH REUTER.

Witnesses:
 FLORENCE G. SHIELDS,
 AUGUSTA SIEMANN.